Dec. 8, 1970  D. W. EGGINS  3,545,296
VARIABLE GEAR TOOTH CONTACT ARRANGEMENT
Filed Dec. 9, 1968  2 Sheets-Sheet 1

INVENTOR.
DOUGLAS W. EGGINS
BY R. A. Eckersley
Patent Agent

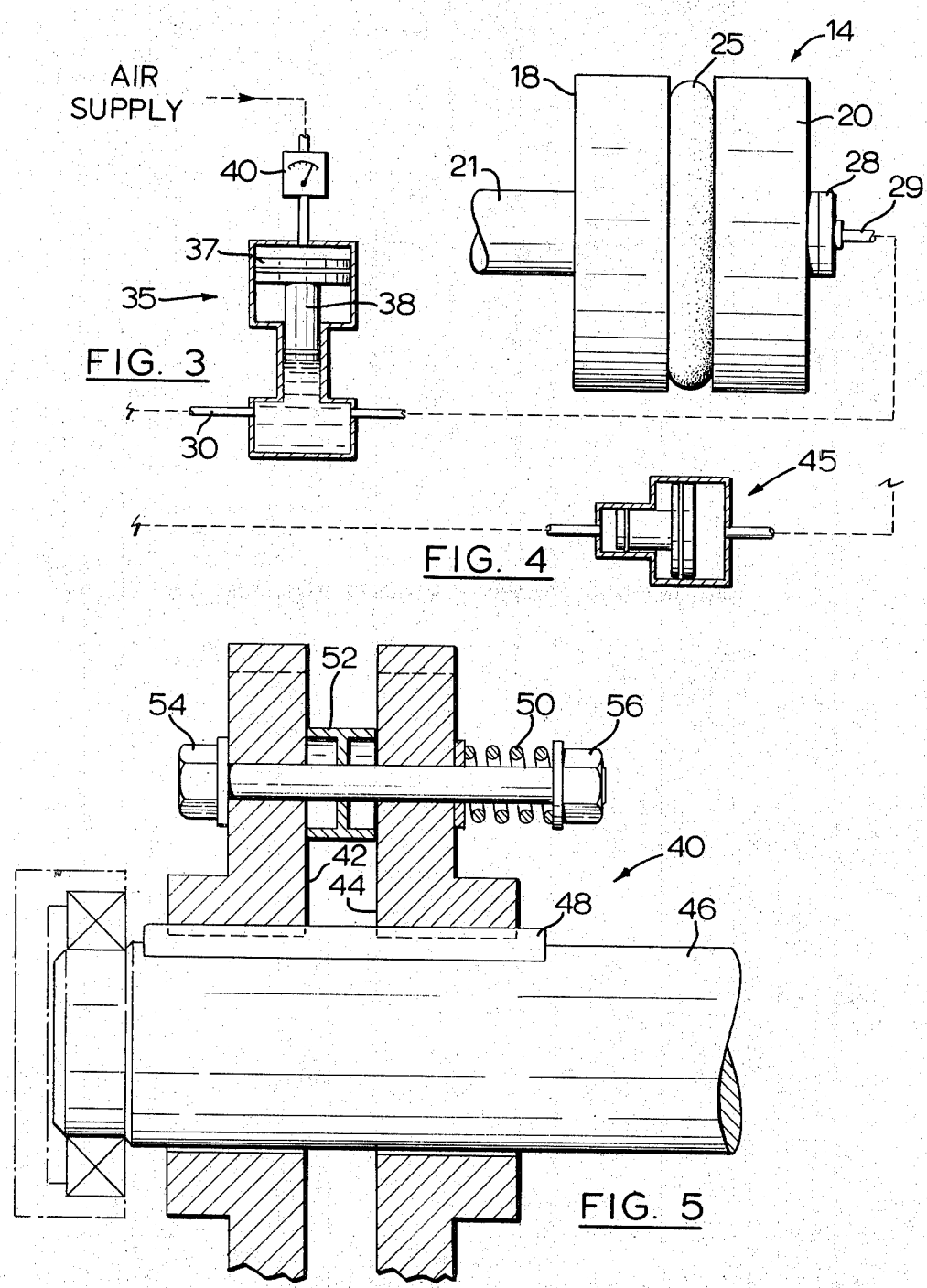

United States Patent Office 3,545,296
Patented Dec. 8, 1970

3,545,296
VARIABLE GEAR TOOTH CONTACT ARRANGEMENT
Douglas Walter Eggins, Scarborough, Ontario, Canada, assignor to Dominion Engineering Works, Limited, Lachine, Quebec, Canada, a corporation of Canada
Filed Dec. 9, 1968, Ser. No. 782,363
Claims priority, application Canada, Dec. 30, 1967, 008,901
Int. Cl. F16h 57/00, 55/18, 37/06
U.S. Cl. 74—410    6 Claims

ABSTRACT OF THE DISCLOSURE

The drive to a large machine having a large gear wheel driven by two or more independent motors includes split pinions driving the gear wheel. The halves of the split pinions being relatively movable to change the effective loading of a respective pinion as compensation for irregularities in the large gear.

---

This invention is directed to a load equalizing system, and in particular to a multi pinion drive gear arrangement.

In the operation of large machines such as autogenous grinding mills the desirable size of machine is increasing to the point where it is not economic to utilize a single electric motor to drive the machine.

In grinding machines and similar large machines it is usual to arrange the electric motor in driving connection with a bull gear by way of a pinion. The economics of construction of electric motors are such that it is desirable to utilize synchronous machines. However, owing to characteristic inconsistencies normally encountered in the production of large bull gear wheels, it is generally not practicable to ensure consistent gear tooth contact, so that unequal loading of the synchronous motors occurs. It is charateristic of synchronous motors that in varying conditions of unequal loading that one motor will tend to assume all the load while the other motor may well tend to act as an alternator.

The present invention contributes to the solution of this problem by providing drive pinions adapted to adjust to local loading variations.

The basis of the pinion structure is tied to the use of a double helical gear utilizing an axially split double helical pinion in which one helix is axially movable relative to the other. By arranging the direction of rotation in order that the two haves of the pinion tend to move either axially apart or axially together in tooth load relieving motion, appropriate pinion loading means may be provided to resiliently resist this unloading tendency.

In addition to providing such loading resilience in a single gear, the present invention also provides a pinion loading system in which the loads of individual pinions are balanced one against the other. Thus, a high spot on the bull gear which tends to instantaneously load-up one of the pinions will produce a change in the pinion loading system, so as to apply a load-increase change to one or more other pinions in the system, so as to maintain the driving synchronous motors in a substantially uniformly loaded condition.

The present invention provides in a gear drive system having a bull gear in driving arrangement with a load, the improvement comprising at least one driving pinion mounted for rotation on a power input shaft, having a first half and a second half axially displaced therefrom, tooth means on the outer peripheries of said first and second pinion halves inclined at an angle in double helical arrangement, and resilient means interconnecting the two halves whereby in operation when increases in loading tend to change the relative axial spacing of the halves such changes are opposed by the resilient axial loading means.

The invention further provides a plurality of split pinions utilizing fluid transmission means interconnecting the pinions whereby a change in a loading or unloading sense in one pinion tends to produce a corresponding change in the same loading or unloading sense in at least one other pinion.

Certain embodiments of the present invention are described, reference being had to the accompanying drawings, wherein;

FIG. 3 shows a pressure equalizing system in accordance with the present invention;

FIG. 4 shows a resilient gear arrangement to provide load accommodation; and

FIG. 5 shows a portion of an alternative, non-symmetrical load sharing system.

Figure 1:
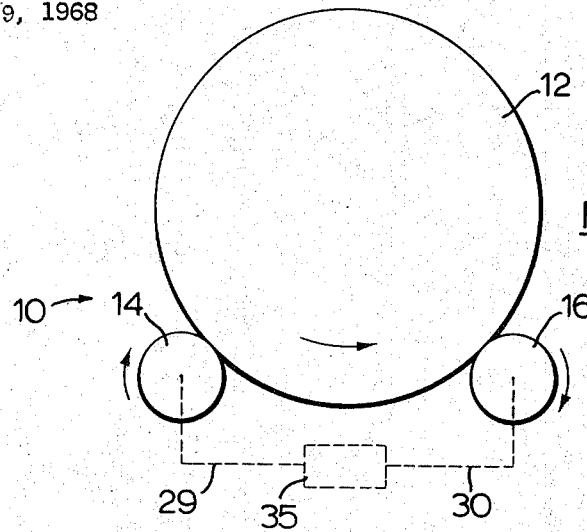
FIG. 1 is a schematic showing of a double helical pinion and gear drive.

Referring to FIG. 1 the drive arrangement 10 comprises a gear 12 mounted in driven meshing relationship with pinions 14, 16.

Figure 2:
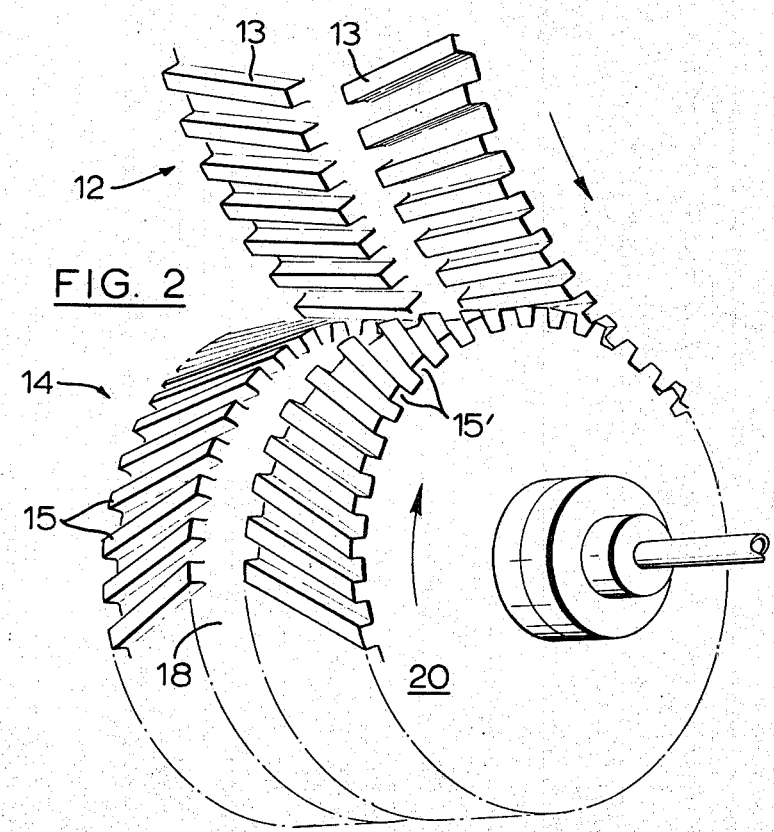
FIG. 2 is a general view of a double helical tooth embodiment as utilized in the present invention.

Referring to FIG. 2, in which the teeth 13 of the gear 12 are shown in meshing arrangement with the teeth 15, 15' of the pinion 14, it will be seen that the leading face portion of the teeth 15, 15' of the pinion 14 are located at the center of the pinion. It can be visualized that the reactive load from the teeth 13 tends to move the two pinion halves 18, 20 axially inwardly one toward the other. Referring to the system illustrated in FIG. 3, the pinion 14 is shown mounted on a shaft 21 for connection to an electric motor. At least one of the pinion halves 18 or 20 is slidably mounted by keys or splines (not shown) to the shaft 21. A flexible diaphragm 25 interposed between the pinion halves 18, 20 and filled with pressurized fluid such as air or hydraulic liquid tends to maintain the half pinions 18, 20 at the desired axial spacing. It will be appreciated that the effective load angle of the electric motor in relation to the driven load becomes changed if the axial spacing of the half pinions 18, 20 is changed in relation to the gear teeth 13 of the gear 12. In the arrangement of FIG. 3 a rotary head 28 connects by way of pipe 29 and pipe 30 to the rotary head or rotary heads of corresponding split pinions 16, etc.

The embodiment of FIG. 3 is illustrated utilizing a hydraulic interconnection, the prevailing pressure within the system being provided by an intensifier 35 having a dual piston 37, 38 pressurized from an air supply source by way of a pressure regulator 40. Thus, in addition to equalizing the pressure intensity within the respective spacing diaphragms 25, the system of FIG. 3 also permits the selection of a desired motor working load angle by regulation of air input through the regulator 40, as applied to the pressure intensifier 35 which determines the hydraulic pressure in the system. In this way the effective load angle of the system motors may be selectively controlled.

Referring to the alternative embodiment illustrated in part in FIG. 4, the insertion of a load intensifier 45 interconnecting one of the pinions with another of the pinions makes it possible for two different hydraulic pressures to be utilized, thus making possible the utilization of electric motors of different frame size and different power. Alternatively, accommodation to different physical characteristics of the individual split pinions may be thus effected.

Referring to FIG. 5 this shows an alternative mechanical pinion arrangement 40, showing details of the manner in which the pinion halves 42, 44 are keyed to the shaft 46 by way of a key 48. Alternatively multiple splining may be employed. In addition, it is contemplated that splines or keys having a "start" i.e., angled relative to the shaft axis may be employed, to suitably affect the axial forces generated between the adjacent pinion halves in response to the axial tooth loading forces. In the embodiment in FIG. 5, the angle of tooth herring-bone is the reverse of that shown in the embodiments of FIGS. 2 and 3, so that on being driven by the shaft 46 the two pinion halves tend to separate or diverge, thereby loading the spring members 50, to provide resilience to the drive. The distance piece 52 limits the minimum distance between the pinion halves 42, 44, while the privision of a stud 54 having an adjustment nut 56 permits the initial axial spring force setting to be changed, with corresponding affect on the motor load angle.

While the embodiments of FIGS. 3 and 4 show a hydraulic coupling system, it is contemplated that a pneumatic system may equally well be used in appropriate circumstances.

In addition to the advantages previously recited in affording utilization of synchronous motors with their improved starting characteristics, the present invention also is particularly beneficial in reducing the demands for extreme accuracy in the manufacture of the respective gear teeth.

What I claim as new and desire to secure by Letters Patent of the United States is:

1. In a single reduction gear drive system having a gear in driving arrangement with a load, the improvement comprising a driving pinion mounted for rotation on a power input shaft, having a first pinion half and a second pinion half axially adjacent thereto, tooth means on the outer peripheries of said first and second pinion halves mutually inclined at an angle in double helical arrangement, and adjustable spring means to provide variable axial loading means directly interconnecting the two halves to provide variable axial resistance to variations of tooth loads whereby in operation when increases in local tooth loading tend to change the relative axial spacing of the halves such change is opposed by the resilient axial loadings means.

2. A plurality of pinions each being axially split and having fluid pressure spring means between the respective halves thereof, fluid transmission means connected in fluid pressure transfer relation between said pinions whereby a change in axial compressive force in a loading or unloading sense in one pinion tends to produce a corresponding change of axial force in the same loading or unloading sense in the other said pinion or pinions.

3. A gear drive system having a gear driven by a plurality of electric motors, each said motor being connected in driving relationship with the gear by a single axially split pinion, fluid pressurizing means connecting the respective axial halves of each said split pinion, to cause pressurization of the fluid in response to tooth loads acting on the pinion halves, and fluid pressure transmitting means interconnecting the fluid pressurizing means of at least two said pinions to transfer fluid pressure therebetween in load sharing relationship.

4. The system as claimed in claim 3 including pressure control means whereby the value of said fluid pressure may be adjusted and the load angle relationship of said motors to the driven load may be effectively controlled.

5. The system as claimed in claim 3 including differential pressure means providing a predetermined ratio between fluid pressures within the system.

6. The method of operating a transmission having two or more prime movers connected in driving relation with a single large gear by way of a single pinion respectively, including the steps of resiliently mounting one half of a said pinion relative to the other half of the pinion, varying the axial spacing of the pinion halves in response to variations in local tooth loadings produced by tooth irregularities, generating a change in pressure of a compressed fluid responsive to the variation in spacing of the pinion halves, and applying the variation in fluid pressure to at least one other like pinion in a corresponding load applying sense, whereby the loads on the prime movers change substantially simultaneously in the same sense in response to variations in local tooth loading.

References Cited
UNITED STATES PATENTS

| | | | |
|---|---|---|---|
| 3,167,975 | 2/1965 | Durand | 74—665 |
| 3,207,002 | 9/1965 | Lakin et al. | 74—665 |
| 3,421,382 | 1/1969 | Henshaw et al. | 74—410 |
| 3,430,508 | 3/1969 | Pope et al. | 74—410 |

LEONARD H. GERIN, Primary Examiner

U.S. Cl. X.R.

74—409, 665